United States Patent
Wallentin

(10) Patent No.: US 8,107,951 B2
(45) Date of Patent: Jan. 31, 2012

(54) COLLECTIVE NOTIFICATION OF NODE RESET TO SUBSET OF CONNECTIONS IN RADIO ACCESS NETWORK

(75) Inventor: Pontus Wallentin, Linkoping (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 1367 days.

(21) Appl. No.: 10/533,643

(22) PCT Filed: Nov. 5, 2003

(86) PCT No.: PCT/SE03/01708
§ 371 (c)(1), (2), (4) Date: Oct. 21, 2005

(87) PCT Pub. No.: WO2004/043086
PCT Pub. Date: May 21, 2004

(65) Prior Publication Data
US 2006/0234706 A1    Oct. 19, 2006

Related U.S. Application Data

(60) Provisional application No. 60/423,600, filed on Nov. 5, 2002.

(51) Int. Cl.
*H04W 24/00* (2009.01)
*H04W 36/00* (2009.01)
*H04W 4/00* (2009.01)
*H04B 7/00* (2006.01)

(52) U.S. Cl. ........ 455/424; 455/436; 455/524; 370/331; 370/328

(58) Field of Classification Search .................. 455/439, 455/466, 436, 524, 423, 424; 370/331, 328; 33/436, 439, 466
See application file for complete search history.

(56) References Cited

U.S. PATENT DOCUMENTS

| 5,835,860 | A  | * | 11/1998 | Diachina ...................... 455/458 |
| 6,108,518 | A  | * | 8/2000  | Madour et al. ............... 340/7.25 |
| 6,366,582 | B1 | * | 4/2002  | Nishikado et al. ............ 370/401 |
| 6,490,452 | B1 | * | 12/2002 | Boscovic et al. ............. 455/436 |
| 6,725,039 | B1 | * | 4/2004  | Parmar et al. ................. 455/436 |
| 6,727,803 | B2 | * | 4/2004  | Hulvey ...................... 340/10.31 |

(Continued)

OTHER PUBLICATIONS

International Preliminary Examination Report completed Jan. 25, 2005 in corresponding PCT Application PCT/SE2003/001708.

(Continued)

*Primary Examiner* — Christopher M Brandt
(74) *Attorney, Agent, or Firm* — Nixon & Vanderhye, P.C.

(57) ABSTRACT

Upon reset of a control node (261) of a radio access network (24) which controls connections with user equipment units (30) in a connected mode, a message (102) indicative of the reset is sent between nodes of the radio access network. The message results from occurrence of a reset procedure (104) affecting the control node. The message includes an element which collectively indicates that a subset of the connections (i.e., not all of the connections) controlled by the control node are to be released. Inclusion in the message of the element, also known as the subset reset element, facilitates return to an idle mode of the user equipment units involved in the subset of the connections. By virtue of inclusion of the subset reset element, the message need not go to one extreme of listing individually each of the connections affected by the reset, nor to another extreme of specifying all connections controlled by the control node.

23 Claims, 9 Drawing Sheets

U.S. PATENT DOCUMENTS

| | | | |
|---|---|---|---|
| 6,788,691 B1* | 9/2004 | Caves et al. | 370/395.64 |
| 6,816,495 B2* | 11/2004 | Nishikado et al. | 370/401 |
| 6,862,450 B2* | 3/2005 | Mikola et al. | 455/438 |
| 6,898,429 B1* | 5/2005 | Vialen et al. | 455/432.1 |
| 7,046,992 B2 | 5/2006 | Wallentin et al. | |
| 7,089,002 B2 | 8/2006 | Wallentin | |
| 7,145,901 B2* | 12/2006 | Tsukada et al. | 370/352 |
| 7,200,110 B1* | 4/2007 | Burns et al. | 370/225 |
| 2001/0034228 A1* | 10/2001 | Lehtovirta et al. | 455/424 |
| 2002/0034228 A1 | 3/2002 | Sugahara | |
| 2002/0065081 A1* | 5/2002 | Barany et al. | 455/450 |
| 2002/0160785 A1* | 10/2002 | Ovesjo et al. | 455/453 |
| 2002/0191562 A1* | 12/2002 | Kumaki et al. | 370/331 |
| 2003/0003895 A1* | 1/2003 | Wallentin et al. | 455/410 |
| 2003/0007510 A1* | 1/2003 | Yeo et al. | 370/469 |
| 2003/0050097 A1* | 3/2003 | Amirijoo et al. | 455/560 |
| 2003/0157953 A1* | 8/2003 | Das et al. | 455/522 |
| 2004/0071126 A1* | 4/2004 | Ramos-Escano et al. | 370/349 |
| 2004/0082366 A1* | 4/2004 | Longoni et al. | 455/561 |
| 2004/0203623 A1* | 10/2004 | Wu | 455/412.1 |
| 2004/0203773 A1* | 10/2004 | Balasubramanian et al. | 455/435.1 |
| 2005/0018607 A1* | 1/2005 | Frouin | 370/230 |

OTHER PUBLICATIONS

R2-020734, "Actions at RNC Reset", 3 GPP TSG-RAN WG2 Meeting #28, Kobe, Japan, Apr. 8-12, 2002.

3GPP TSG-RAN WG3 Meeting #nn, Tdoc R3-02xdxxx, Oct. 2002.

3GPP TSG-RAN WG2 Meeting #33, Tdoc R2-02xxxx, Sophia Antipolis, France, Nov. 11-15, 2002.

* cited by examiner

US 8,107,951 B2

COLLECTIVE NOTIFICATION OF NODE RESET TO SUBSET OF CONNECTIONS IN RADIO ACCESS NETWORK

This application is the US national phase of international application PCT/SE2003/001708 filed 5 Nov. 2003 which designated the U.S. and claims benefit of U.S. 60/423,600, filed 5 Nov. 2002, the entire contents of each of which are hereby incorporated by reference.

This application is a continuation-in-part of U.S. patent Ser. No. 10/113,944, filed Apr. 2, 2002, entitled "AUTHENTICATION OF TERMINATION MESSAGES IN TELECOMMUNICATIONS SYSTEM", and a continuation-in-part of U.S. patent Ser. No. 09/852,915, filed May 11, 2001, entitled "RELEASING PLURAL RADIO CONNECTIONS WITH OMNIBUS RELEASE MESSAGE," and is related to U.S. Provisional Patent Application Ser. No. 60/317,970, filed Sep. 20, 2001, entitled RECOVERY OF MOBILE STATION(S) IN CONNECTED MODE UPON RNC FAILURE, all of which are incorporated herein by reference in their entirety.

BACKGROUND

1. Field of the Invention

This invention pertains generally to telecommunications, and particularly to returning a user equipment unit to idle mode after a reset of a control node of a radio access network.

2. Related Art and Other Considerations

In a typical cellular radio system, wireless user equipment units (UEs) communicate via a radio access network (RAN) to one or more core networks. The user equipment units (UEs) can be mobile stations such as mobile telephones ("cellular" telephones) and laptops with mobile termination, and thus can be, for example, portable, pocket, hand-held, computer-included, or car-mounted mobile devices which communicate voice and/or data with radio access network. Alternatively, the wireless user equipment units can be fixed wireless devices, e.g., fixed cellular devices/terminals which are part of a wireless local loop or the like.

The radio access network (RAN) covers a geographical area which is divided into cell areas, with each cell area being served by a base station. A cell is a geographical area where radio coverage is provided by the radio base station equipment at a base station site. Each cell is identified by a unique identity, which is broadcast in the cell. The base stations communicate over the air interface (e.g., radio frequencies) with the user equipment units (UE) within range of the base stations. In the radio access network, several base stations are typically connected (e.g., by landlines or microwave) to a radio network controller node (RNC). The radio network controller, also sometimes termed a base station controller (BSC), supervises and coordinates various activities of the plural base stations connected thereto. The radio network controllers are typically connected to one or more core networks. The core network has service domains, with an RNC having an interface to these service domains.

One example of a radio access network is the Universal Mobile Telecommunications (UMTS) Terrestial Radio Access Network (UTRAN). The UMTS is a third generation system which in some respects builds upon the radio access technology known as Global System for Mobile communications (GSM) developed in Europe. UTRAN is essentially a radio access network providing wideband code division multiple access (WCDMA) to user equipment units (UEs). The Third Generation Partnership Project (3GPP) has undertaken to evolve further the UTRAN and GSM-based radio access network technologies.

Other types of telecommunications systems which encompass radio access networks include the following: Advance Mobile Phone Service (AMPS) system; the Narrowband AMPS system (NAMPS); the Total Access Communications System (TACS); the Personal Digital Cellular (PDS) system; the United States Digital Cellular (USDC) system; and the code division multiple access (CDMA) system described in EIA/TIA IS-95.

The topology of a radio access network can be conceptualized in areas or units larger than cells. Taking the UTRAN as an example radio access network, a UTRAN Routing Area (URA) is a geographical area comprising one or more cells. Each URA is identified by a unique identity which is broadcast in all cells belonging to the URA. A URA can comprise cells controlled by more than one RNC. A URA with more cells in more than one RNC is overlapping between the RNCs, i.e. an overlapping URA.

As another example from UTRAN, a Location Area (LA) is a geographical area comprising one or more cells. Each LA is identified by a unique identity sent on the broadcast channel, in the same way as the URA. However, a location area is used by the core network to track the location of the UE (in idle mode and in connected mode), while the URA is used by the radio access network to track the location of the UE in connected mode. Typically, a location area is geographically larger than a URA. To each location area there is one of several RNCs having cells in that particular location area. A relationship between location area and RNC is stored in the core network.

There are several interfaces of interest in the UTRAN. The interface between the radio network controllers (RNCs) and the core network(s) is termed the "Iu" interface. The interface between a radio network controller (RNC) and its base stations (BSs) is termed the "Iub" interface. The interface between the user equipment unit (UE) and the base stations is known as the "air interface" or the "radio interface" or "Uu interface". In some instances, a connection involves both a Serving or Source RNC (SRNC) and a target or drift RNC (DRNC), with the SRNC controlling the connection but with one or more diversity legs of the connection being handling by the DRNC. An Inter-RNC transport link can be utilized for the transport of control and data signals between Source RNC and a Drift or Target RNC, and can be either a direct link or a logical link. An interface between radio network controllers (e.g., between a Serving RNC [SRNC] and a Drift RNC [DRNC]) is termed the "Iur" interface.

The radio network controller (RNC) controls the UTRAN. In fulfilling its control role, the RNC manages resources of the UTRAN. Such resources managed by the RNC include (among others) the downlink (DL) power transmitted by the base stations; the uplink (UL) interference perceived by the base stations; and the hardware situated at the base stations.

Those skilled in the art appreciate that, with respect to a certain RAN-UE connection, an RNC can either have the role of a serving RNC (SRNC) or the role of a drift RNC (DRNC). If an RNC is a serving RNC (SRNC), the RNC is in charge of the connection with the user equipment unit (UE), e.g., it has full control of the connection within the radio access network (RAN). A serving RNC (SRNC) is connected to the core network. On the other hand, if an RNC is a drift RNC (DRNC), its supports the serving RNC (SRNC) by supplying radio resources (within the cells controlled by the drift RNC (DRNC)) needed for a connection with the user equipment unit (UE). A system which includes the drift radio network controller (DRNC) and the base stations controlled over the Iub Interface by the drift radio network controller (DRNC) is herein referenced as a DRNC subsystem or DRNS.

Radio access networks typically have a particular signalling protocol employed between the radio access network and the user equipment unit to support the management of radio resources. For example, UTRAN has its Radio Resource Control (RRC) layer 3 signalling protocol. A user equipment unit in the RRC protocol operates in a state model conceptualized as having two modes: an Idle Mode and a Connected Mode. The Idle Mode is entered after power on. In Idle Mode there is no connection between the user equipment unit (UE) and the UTRAN. When an RRC connection is established, the user equipment unit (UE) is assigned a U-RNTI and the user equipment unit (UE) enters Connected Mode. The U-RNTI (UTRAN Radio Network Temporary Identity) is a global identity, which can be used in any cell in the UTRAN. In Connected Mode, the RNC in charge of the RRC connection for this UE is denoted as the Serving RNC (SRNC). The U-RNTI consists of two parts: the SRNC-identity (which within UTRAN identifies the SRNC for this UE) and the Serving RNTI (S-RNTI) which identifies the RRC connection within the particular SRNC.

As illustrated by FIG. 8, within Connected Mode there are four different states: CELL_DCH state; CELL_FACH state; CELL_PCH state; and URA_PCH. As briefly summarized, each state reflects a different level of activity. In the CELL_DCH state a dedicated control channel (DCCH) is used for transmission of signalling messages between the user equipment unit (UE) and the UTRAN. In the CELL_FACH state, no dedicated physical channel is assigned, but the user equipment unit (UE) listens continuously to a common channel (the FACH) in the downlink belonging to the selected cell. In the uplink for the CELL_FACH state, the user equipment unit (UE) typically uses a random access channel (RACH). At each cell reselection, the user equipment unit (UE) updates the network with its current cell location. In the CELL_PCH state, the user equipment unit (UE) monitors a paging channel (PCH) of a selected cell. In the CELL_PCH state the user equipment unit (UE) updates the network with its current cell location at cell reselection. On the PCH, means for addressing individual user equipment units (UEs) exist (using the U-RNTI), but the user equipment unit (UE) can not transport any signalling messages to the network. The URA_PCH state resembles the CELL_PCH state, but primarily differs in that the user equipment unit (UE) only updates the network of its location after crossing UTRAN Routing Area (URA) borders.

In making or attempting to make connection with a user equipment unit operating in a radio access network, a core network typically assigns a core network UE identity (e.g., CN UE identity) to the user equipment unit. But the CN UE identity assigned to a particular user equipment unit may not be unique CN UE identity when used on a common transport channel to a connected mode UE. Keep in mind that there may be several core networks which are assigning CN UE identities. It may turn out, for example, that an idle mode UE registered in different location and/or routing area may camp in the same cell as with a connected mode UE, with both the idle mode UE and connected mode UE having been assigned the same CN UE identity. The typical scenario when such common assignment may happen is when the connected mode UE camps in a cell controlled by a drift RNC (DRNC). If the DRNC receives a paging message from a CN node, intended to the idle mode UE, it should be able to use the CN UE identity as the identity when paging the idle mode UE without a risk that the connected mode UE may respond to the page.

In order to avoid such confusion, an RNC which receives a page from the core network handles the page differently depending on whether the RNC has an established RRC connection the given UE or not. For example, if the UE to be paged is in connected mode, the connected mode UE is addressed for paging purposes using the U-RNTI (described above). On the other hand, if the UE to be paged is in idle mode, the idle mode UE is addressed for paging purposes using the CN UE identity assigned to the idle mode UE.

An RNC generally has interfaces to base stations, interfaces to other RNCs, diversity handover functionality, and other components and functional units employed, e.g., in conjunction with the radio resource control protocol. Various functionalities of the RNC are preformed by several processors which are running (executing) different processes and/or handling different RRC connections. Typically, the control of the UE connections owned by the RNC is shared or partitioned among the processors, so that one processor handles only a part, group, or subset of the UEs having connections controlled by the RNC.

There are times at which the RNC of a radio access network must undergo a RNC "reset" (also known as a RNC "restart"). As explained subsequently below, RNC reset can have considerable ramifications, including but not limited to ramifications for paging of UEs.

There are two basic types of situations in which RNC reset occurs. The first type of situation is a failure of the RNC itself, discussed in more detail below. The second type of situation is propagated from a core network node (e.g. MSC, SGSN) which had a failure and which transmits a RESET message to the RNC. In this second type of situation, the RNC deletes the information stored for all UE connections (including bringing the UEs to idle mode) and replies to the CN node with a RESET ACKNOWLEDGE message.

There are several possible causes of the first type of situation, i.e., failure of the RNC causing RNC reset. For example, hardware glitches may typically affect one or a few of the processors comprising the RNC. As another example, software upgrades (typically made on a processor by processor basis) may require reboot of the processor involved in the upgrade. But perhaps the most common cause of RNC reset is a problem discovered in execution of software by one of the processors of the RNC. The execution problem may require remedial action such as a reboot, for example. Typically in such failure it is sufficient to restart just the processor where the failure was detected, and then propagate clean-up operations to any other processors that may be dependent on the processor that restarted. In other less drastic cases, in which the software fault can be isolated to just one particular process performed by a processor, the processor itself may not need to be restarted just because the particular process crashed, but the process itself must be restarted (but nevertheless essentially causing a RNC reset). In more serious cases it may be detected that repeated restarts of a problematic processor do not solve the problem, thereby requiring restart of all processors of the RNC as the recovery measure.

Whatever the cause or situation requiring reset, it is a problem that, upon being reset, a control node of a radio access network, such as an radio network controller (RNC) of the UTRAN, may lose certain information about the context of the user equipment unit, known as the "UE context" in the UTRAN.

The information included in UE context comprises, among others, the following parameters: IMSI (the international mobile subscriber identity); C-ID; D-RNTI; and RNC Identity of the DRNC where the user equipment unit (UE) is currently located. The international mobile subscriber identity (IMSI) [which comprises not more than fifteen digits] comprises three components: a mobile country code (MCC) [three digits]; a mobile network code (MNC) [two or three digits]; and a mobile subscriber identification number (MSIN). The D-RNTI parameter is similar to S-RNTI parameter, but identifies the UE context information in the DRNC. The C-ID parameter is the Cell Identity of where the UE is currently located. The C-ID parameter is not applicable to the UEs in the URA_PCH state, since the location of a user equipment unit (UE) in the URA_PCH state is not known to the cell level, but rather is known on URA level (a group of cells defined as one URA). With regard to the RNC Identity parameter, it is noted that in the Cell_DCH state there could be many simultaneous radio links (RLs), so there could conceivably be as many RNCs (at least theoretically) handling legs of connections to the UE.

Consider, for example, the case of a connected mode UE whose UE context was lost during RNC reset. Loss of the UE context necessarily means loss of the U-RNTI for that connected mode UE. One problem is that the connected mode UE expects to be addressed using the (now lost) U-RNTI. So in view of the loss of UE context and U-RNTI in particular, paging of the connected mode UE may be ineffective until that UE goes back to idle mode.

A typical scenario occurs when a UE camps in a cell that is controlled by one RNC (the "DRNC"), while the control of the radio connection for this particular UE is handled by a different RNC (the "SRNC"). In case of a reset of the SRNC, all DRNCs need to release the radio connections for all UEs having connections which were controlled by the reset SRNC and which are camping on cells controlled by the DRNCs.

The present conventional mechanism for aligning the resources of two RNCs ($RNC_1$ and $RNC_2$) in the event of an abnormal failure and for releasing radio connections in such scenario is awkward and inefficient. In accordance with this mechanism, after reset of a particular RNC, the reset RNC transmits RESET REQUEST messages to all neighboring RNCs (which may serve as DRNCs for the UEs that had the RNC that was reset as their SRNC). In the RESET REQUEST message there is a possibility either to address "all" UEs or to provide a list of UE identities. The DRNC is expected to release all radio connections that were addressed in the RESET REQUEST message and then return a RESET RESPONSE message to the SRNC.

As a practical matter, in accordance with the present mechanism the DRNC has to release the RRC connections one by one (from the S-RNTI list in the RESET REQUEST message or all S-RNTIs). This release of RRC connections one by one takes considerable time, employs extensive signaling, and runs the risk that before a given RRC connection is released a page to that UE involved in that RRC connection may be lost.

What is needed, therefore, and an object of the present invention, is a more effective way to communicate the fact of RNC reset.

BRIEF SUMMARY

Upon reset of a control node of a radio access network which controls connections with user equipment units in a connected mode, a message indicative of the reset is sent between nodes of the radio access network. The message results from occurrence of a reset procedure affecting the control node. The message includes an element which collectively indicates that a subset of the connections (i.e., not all of the connections) controlled by the control node are to be released. Inclusion in the message of the element, also known as the subset reset element, facilitates return to an idle mode of the user equipment units involved in the subset of the connections. By virtue of inclusion of the subset reset element, the message need not go to one extreme of listing individually each of the connections affected by the reset, nor to another extreme of specifying all connections controlled by the control node.

In one example mode, the node which prepares the message is the control node which controls the connections. In an example implementation in which the UTRAN is the radio access network, the control node is a radio network control (RNC) node, i.e., a SRNC node, and the message is a RNSAP RESET REQUEST message.

Inclusion of the subset reset element in the message is particularly advantageous in a situation in which the control node performs plural processes, with each of the plural processes handling a respective one of plural subsets of connections. In such situation, when the reset procedure affects a specific one of the plural processes, a subset reset element corresponding to the respective one of the plural subsets of connections handled by the specific one of the plural processes is included in the message. In this way, the connections affected by the reset are collectively referenced in the message (by the subset reset element which identifies the subset of affected connections). Should plural processes be affected by the reset, the message can include plural subset reset elements corresponding to the respective affected subsets. In other words, the message can include a sequence of subset reset elements.

In an illustrative implementation, the subset reset element comprises a group identity for the subset of connections. The group identity in turn comprises a group value and a group bit mask index. The group bit mask index indicates bits of the group value which are common for all connections of the subset of connections. For example, in one example the group value is a group S-RNTI and the group bit mask index indicates the bits of the group S-RNTI which are common for all connections of the subset of connections.

As an optional but preferred feature, the message can also include an authentication indicia known as the group release key. The authentication mechanism renders a communications network impervious to unauthorized requests for termination or cessation of interaction with a mobile node.

In another example mode, the node which prepares the message is a radio network control node which provides radio resources for the connections controlled by another radio network control node. In an example implementation in which the UTRAN is the radio access network, the control node which prepares the message is a drift radio network control (DRNC) node and the message is one of a RRC CONNECTION RELEASE message and a PAGING TYPE 1 message which is sent to base stations in cells controlled by the DRNC node. Typically the drift radio network control (DRNC) node prepares and sends its message (e.g., RRC CONNECTION RELEASE message or PAGING TYPE 1 message), also known as the "further message", upon receipt from a serving RNC (SRNC) node of a prompting message (such as the RNSAP RESET REQUEST message) which also carries the subset reset element.

When the message is considered to be the further message sent by the DRNC node, the subset reset element can again be conceptualized as comprising a group identity. For this further message sent by the DRNC, however, the group identity comprises a control node identifier, a group value, and a group bit mask index. The group bit mask index indicates bits of the group value which are common for all connections of the subset of connections. In an illustrated example involving the UTRAN, in the RRC CONNECTION RELEASE message or PAGING TYPE 1 message the group value is a group U-RNTI and the group bit mask index indicates the bits of the U-RNTI value which are common for all connections of the subset of connections.

The invention thus also encompasses, not only specific nodes, but also a radio access network of a telecommunications system. The radio access network comprises a serving control node (which controls connections with user equipment units in a connected mode) and at least one drift control node (which provides radio resources in cells controlled by the at least one drift control node for some of the connections handled by the serving control node). In one mode, the serving control node sends the message with the subset reset element(s) to collectively indicate that a subset of the connections are to be released, thereby facilitating return to the idle mode of the user equipment units involved in the subset. In the example UTRAN implementation, the message is a RNSAP RESET REQUEST message. The at least one drift control node sends a further message to a base station controlled by the at least one drift control node, the further message including a further element, the further element being derived from the element included in the message. In the example UTRAN implementation, such further message is one of a RRC CONNECTION RELEASE message and a PAGING TYPE 1 message. In this further message, the further subset reset element is a group identity which comprises (1) a control node identifier indicative of the serving control node, (2) a group value, and (3) a group bit mask index. The group value, and the group bit mask index are derived from the subset reset element of the first message sent from the SRNC node. In the example UTRAN implementation, the group value is a group U-RNTI and the group bit mask index indicates the bits of the U-RNTI value which are common for all connections of the subset of connections.

The invention also encompasses methods of operating a radio access network of a telecommunications system, the radio access network including the serving control node and at least one drift control node. In accordance with the methods, a reset procedure is performed at the serving control node. The serving control node then sends to the at least one drift control (DRNC) node a message resulting from performance of the reset procedure, the message including the subset reset element(s). In the example UTRAN implementation, the message sent by the SRNC node is a RNSAP RESET REQUEST message. The DRNC node uses the message with the subset reset element so that the user equipment units involved in the subset of the connections can return to an idle mode. In particular, the DRNC node sends further messages to base stations in cells controlled by the DRNC node. In the example UTRAN implementation, such message can be one or more of a RRC CONNECTION RELEASE message and a PAGING TYPE 1 message. Reception of the further message by user equipment unit over an air interface causes the user equipment unit to release the RRC connection, and to return to idle mode (thereby leaving connected mode). Under these circumstances, the user equipment unit (now in idle mode) is in a better position than in the connected mode to receive paging.

The invention also encompasses the messages and message formats utilized, including a message which includes one or more elements (i.e., subset reset element(s)) which collectively indicate that a subset of the connections are to be released so that the user equipment units involved in the subset of the connections can return to an idle mode.

Also disclosed are a control node of a radio access network of a telecommunications system and method of operating the same. The control node has plural processes which handle a respective one of plural subsets of connections with user equipment units in a connected mode. The control node is arranged upon initiating a new connection to assign the new connection to a selected one of the plural processes and to assign to the new connection a S-RNTI value from which it can be discerned that the new connection has been assigned to the selected one of the plural processes. In particular, in an example implementation the control node assigns to the new connection a S-RNTI value in which predetermined bits have common values with other connections assigned to the selected one of the plural processes

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

DETAILED DESCRIPTION OF THE DRAWINGS

In the following description, for purposes of explanation and not limitation, specific details are set forth such as particular architectures, interfaces, techniques, etc. in order to provide a thorough understanding of the present invention.

However, it will be apparent to those skilled in the art that the present invention may be practiced in other embodiments that depart from these specific details. In other instances, detailed descriptions of well-known devices, circuits, and methods are omitted so as not to obscure the description of the present invention with unnecessary detail. Moreover, individual function blocks are shown in some of the figures. Those skilled in the art will appreciate that the functions may be implemented using individual hardware circuits, using software functioning in conjunction with a suitably programmed digital microprocessor or general purpose computer, using an application specific integrated circuit (ASIC), and/or using one or more digital signal processors (DSPs).

Figure 1:
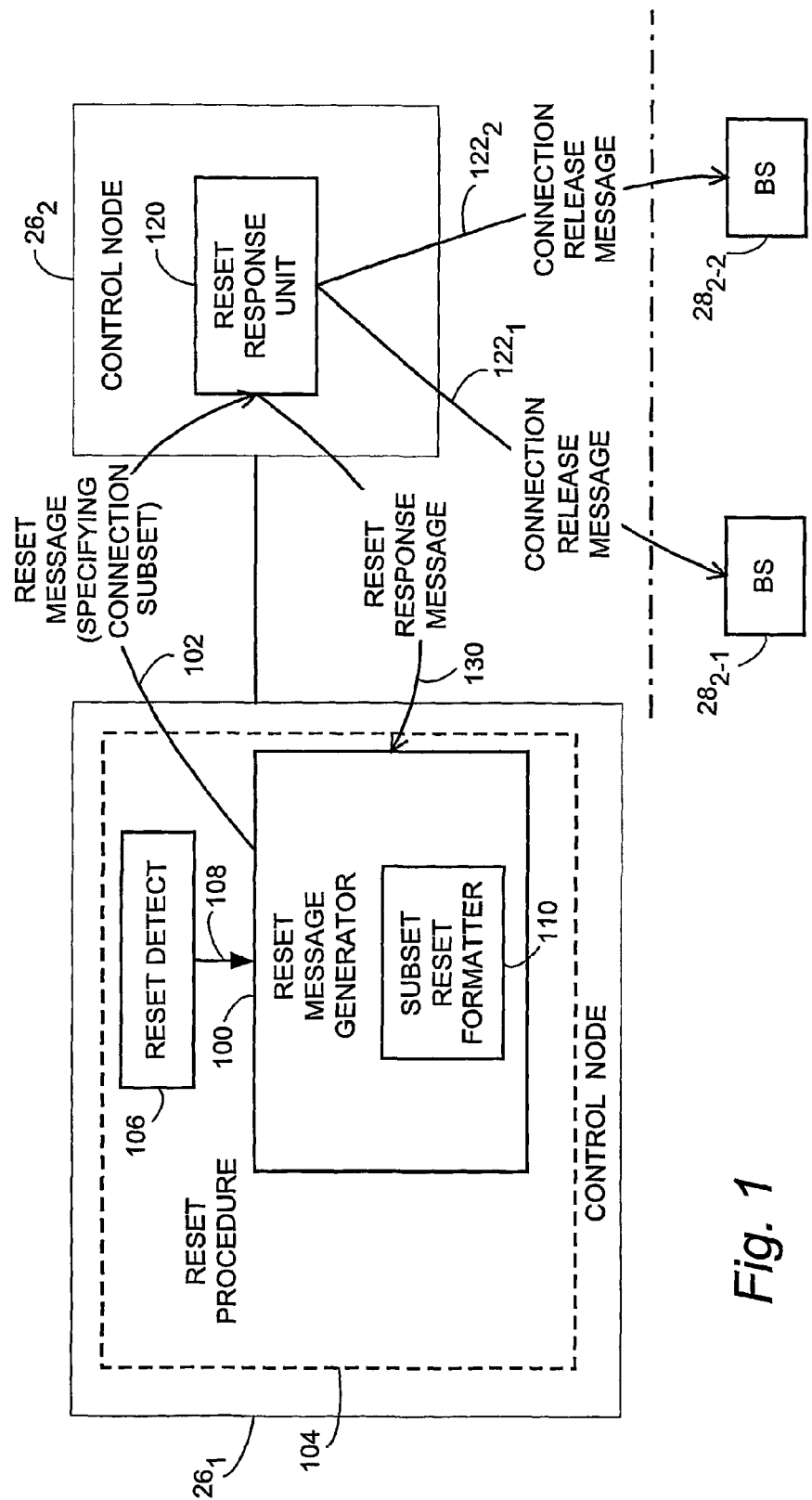
FIG. 1 is a schematic view of portions of a radio access network showing two control nodes and a reset message generator in one of the control nodes which generates a reset message to the other control node in conjunction with a reset procedure.

FIG. 1 illustrates selected portions of an example, representative radio access network having two control nodes $26_1$ and $26_2$ with a reset message generator 100 provided in one of the control nodes (i.e., control node $26_1$). The reset message generator 100 generates a reset message 102 to the other control node (i.e., control node $26_2$) in conjunction with a reset procedure 104 performed at control node $26_1$.

The control node $26_1$ controls connections with user equipment units in a connected mode. When a reset detector 106 of control node $26_1$ detects or determines that a reset has occurred at control node $26_1$, as indicated by arrow 108 the reset detector 106 prompts the reset message generator 100 to generate a message indicative of the reset (e.g., reset message 102) for transmission between control nodes of the radio access network, e.g., between control node $26_1$ and control node $26_2$.

As shown in FIG. 1, the reset message generator 100 includes subset reset element formatter 110 which prepares, for inclusion in reset message 102, an element which collectively indicates that a subset of the connections (i.e., not all of the connections) controlled by the control node $26_1$ are to be released. The element, hereinafter also referred to as the subset reset element, thus specifies a subset of the connections controlled by control node $26_1$ that are to be released. The terms "subset" and "group" are utilized interchangeably herein, both terms referring to plural connections but less than all connections controlled by a control node such as control node $26_1$.

Inclusion in the message 102 of the subset reset element facilitates return to an idle mode of the user equipment units involved in the subset of the connections. Return to the idle mode renders the user equipment units better amenable to paging requests. By virtue of inclusion of the subset reset element, the message 102 need not go to one extreme of listing individually each of the connections affected by the reset, nor to another extreme of specifying all connections controlled by the control node.

FIG. 1 illustrates that control node $26_2$ includes a reset response unit 120 which represents functionality for responding to the reset message 102. The reset message 102 includes the subset reset element which collectively indicates or specifies that a subset of the connection (connection subset or group of connections) controlled by the control node $26_1$ are to be released. As explained subsequently in more detail in an illustrative example implementation, upon receipt of the reset message 102 the reset response unit 120 prepares and sends one or more types of connection release messages to base stations in cells for which control node $26_2$ controls radio resources. For example, the reset response unit 120 sends connection release message $122_1$ to base station $28_{2-1}$ and connection release message $122_2$ to base station $28_{2-2}$. As illustrated in FIG. 1, the connection release message 122 are merely representative messages. In addition, upon successful transmission of the connection release message 122, the reset response unit 120 of control node $26_2$ returns a reset response message 130 to control node $26_1$.

Figure 2:
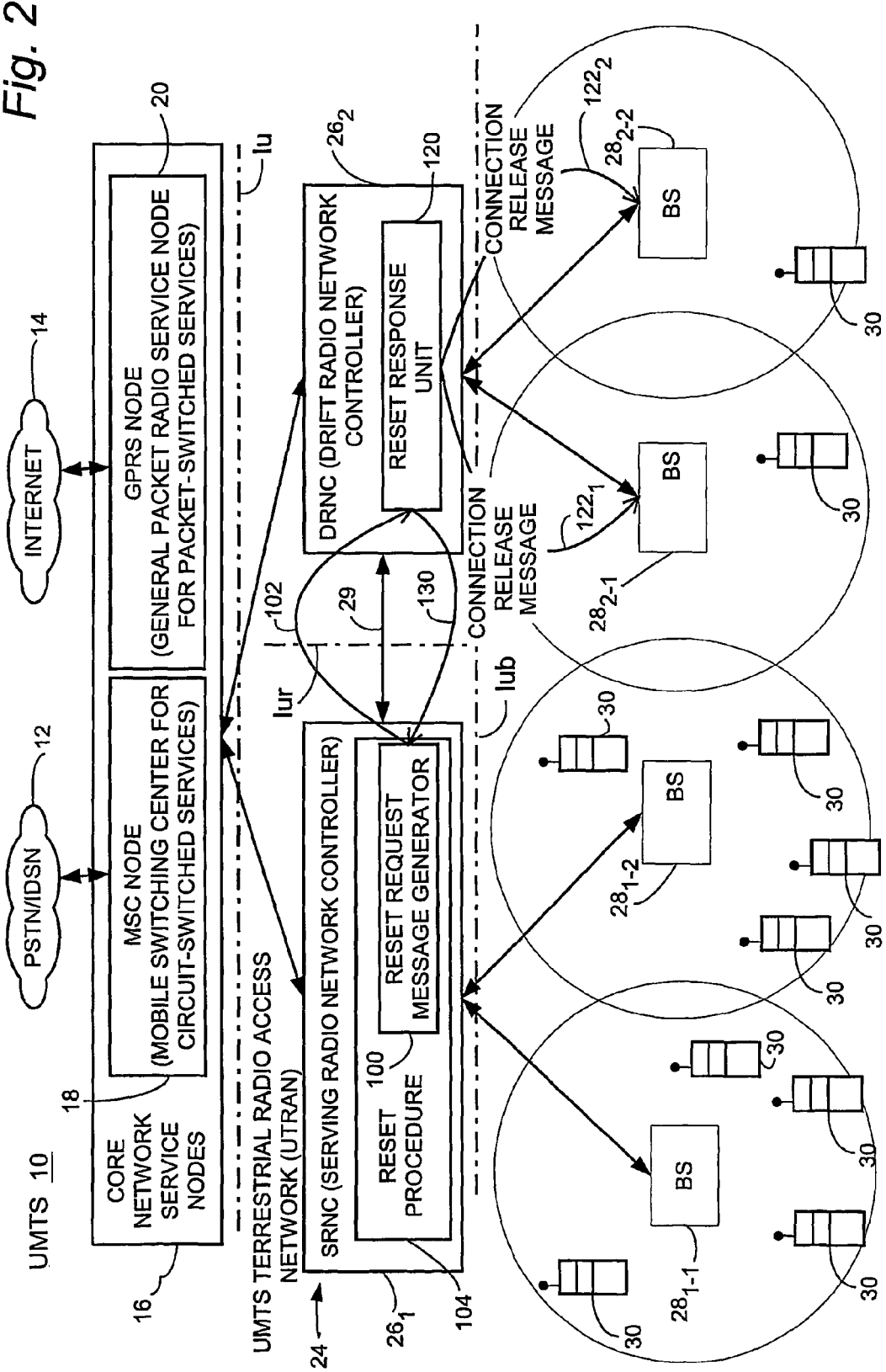
FIG. 2 is a diagrammatic view of an example mobile communications system in which the present invention may be advantageously employed.

Usage of the reset message 102 with its subset reset element is illustrated in FIG. 2 in the non-limiting, example context of a universal mobile telecommunications (UMTS) 10. A representative, connection-oriented, external core network, shown as a cloud 12 may be for example the Public Switched Telephone Network (PSTN) and/or the Integrated Services Digital Network (ISDN). A representative, connectionless external core network shown as a cloud 14, may be for example the Internet. Both core networks are coupled to their corresponding service nodes 16. The PSTN/ISDN connection-oriented network 12 is connected to a connection-oriented service node shown as a Mobile Switching Center (MSC) node 18 that provides circuit-switched services. The Internet connectionless-oriented network 14 is connected through a Gateway General Packet Radio Service (GPRS) support node (GGSN) 19 to a General Packet Radio Service (GPRS) Service (SGSN) node 20, the latter being tailored to provide packet-switched type services.

Gateway GRPS support node (GGSN) 19 provides the interface towards the packet-switched networks (e.g., the Internet, X.25 external networks) represented by cloud 14. Gateway GRPS support node (GGSN) 19 translates data formats, signaling protocols and address information in order to permit communication between the different networks. Serving GPRS Support Node (SGSN) 20 provides packet routing to an from a SGSN service area, and serves GPRS subscribers which are physically located within the SGSN service area. Serving GPRS Support Node (SGSN) 20 provides functions such as authentication, ciphering, mobility management, charging data, and logical link management toward the user equipment unit. A GPRS subscriber may be served by any SGSN in the network depending on location. The functionality of Serving GPRS Support Node (SGSN) 20 and Gateway GRPS support node (GGSN) 19 may be combined in the same node, or may exist in separate nodes as shown in FIG. 2. Backbone network 21 provides connection between different GSN nodes and other components of the core network, and can be, e.g., an Internet Protocol (IP) network.

Each of the core network service nodes 18 and 20 connects to a UMTS Terrestrial Radio Access Network (UTRAN) 24 over a radio access network (RAN) interface referred to as the Iu interface. UTRAN 24 includes one or more radio network controllers (RNCs) 26 and one or more base stations (BS) 28. For sake of simplicity, the UTRAN 24 of FIG. 2 is shown with only two RNC nodes, particularly RNC $26_1$ and RNC $26_2$. Each RNC 26 is connected to one or more base stations (BS) 28. For example, and again for sake of simplicity, two base station nodes are shown connected to each RNC 26. In this regard, RNC $26_1$ serves base station $28_{1-1}$ and base station $28_{1-2}$, while RNC $26_2$ serves base station $28_{2-1}$ and base station $28_{2-2}$. It will be appreciated that a different number of base stations can be served by each RNC, and that RNCs need not serve the same number of base stations. Moreover, FIG. 2 shows that an RNC can be connected over an Iur interface 29 to one or more other RNCs in the UTRAN 24. Further, those skilled in the art will also appreciate that a base station is sometimes also referred to in the art as a radio base station, a node B, or B-node.

It should be understood that at least one and likely more of the RNCs of the radio access network have an interface to one or more core networks. Further, in order to support continuation of established connections when the UE is moving between cells controlled by different RNCs in the Radio Access Network, a Signalling Network (e.g. Signalling System No 7) enables RNCs to perform the required RNC-RNC signalling.

In the illustrated embodiments, for sake of simplicity each base station 28 is shown as serving one cell. Each cell is represented by a circle which surrounds the respective base station. It will be appreciated by those skilled in the art, however, that a base station may serve for communicating across the air interface for more than one cell. For example, two cells may utilize resources situated at the same base station site. Moreover, each cell may be divided into one or more sectors, with each sector having one or more cell/carriers.

A user equipment unit (UE), such as user equipment units (UEs) 30 shown in FIG. 2, communicate with one or more cells or one or more base stations (BS) 28 over a radio or air interface 32. Each of the radio interface 32, the Iu interface, the Iub interface, and the Iur interface are shown by dash-dotted lines in FIG. 2.

Preferably, radio access is based upon Wideband, Code Division Multiple Access (WCDMA) with individual radio channels allocated using CDMA spreading codes. Of course, other access methods may be employed. WCDMA provides wide bandwidth for multimedia services and other high transmission rate demands as well as robust features like diversity handoff and RAKE receivers to ensure high quality.

In cell_DCH state, each user mobile station or equipment unit (UE) 30 is assigned its own scrambling code in order for a base station 28 to identify transmissions from that particular user equipment unit (UE) as well as for the user equipment unit (UE) to identify transmissions from the base station intended for that user equipment unit (UE) from all of the other transmissions and noise present in the same area.

Figure 3:
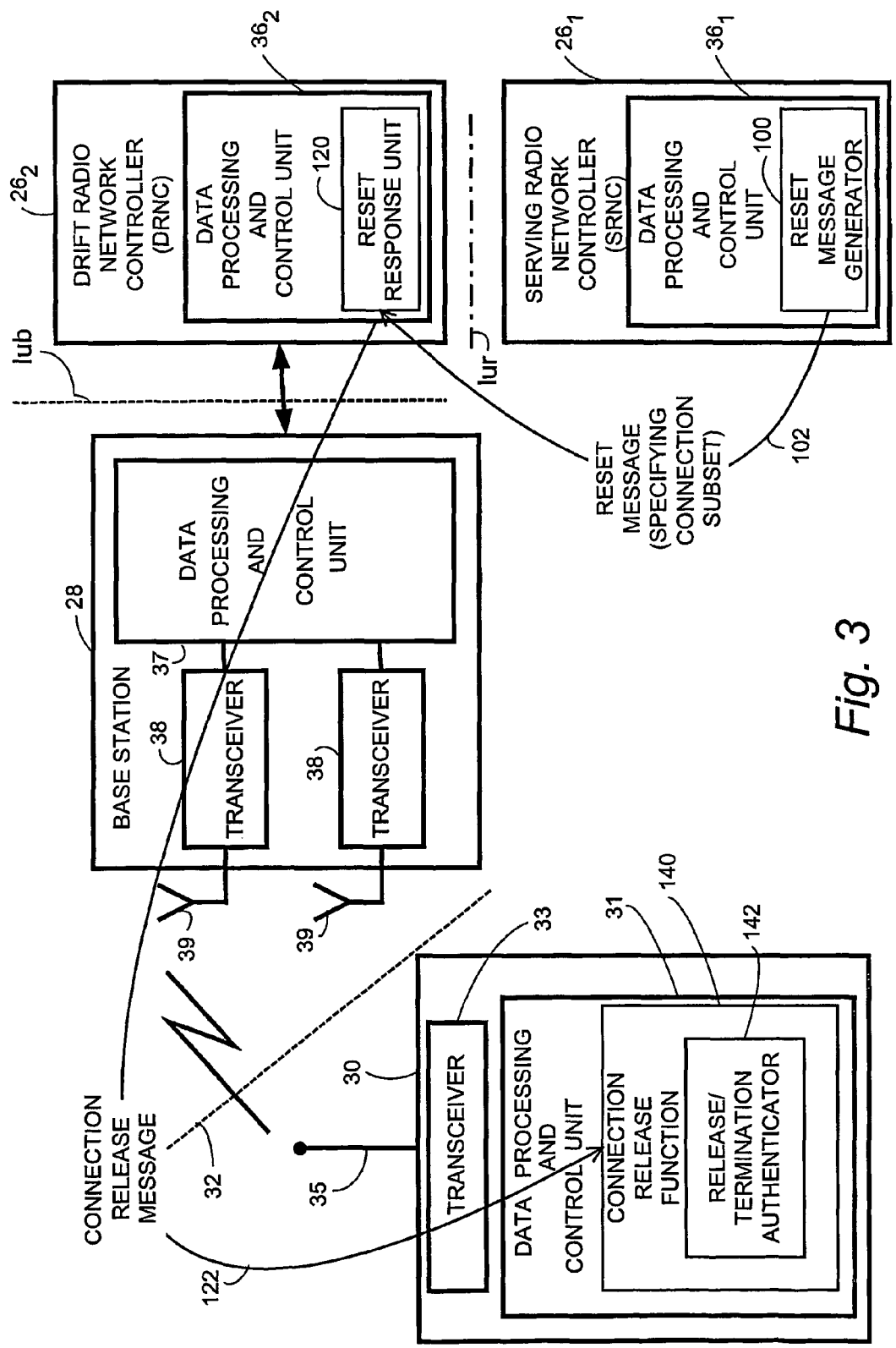
FIG. 3 is a simplified function block diagram of a portion of a UMTS Terrestrial Radio Access Network, including a user equipment unit (UE) station; a drift radio network controller; a serving radio network controller; and a base station.

FIG. 3 shows selected general aspects of user equipment unit (UE) 30 and illustrative nodes such as radio network controller 26 and base station 28. The user equipment unit (UE) 30 shown in FIG. 3 includes a data processing and control unit 31 for controlling various operations required by the user equipment unit (UE). The UE's data processing and control unit 31 provides control signals as well as data to a radio transceiver 33 connected to an antenna 35. The data processing and control unit 31 of the user equipment unit 30 includes a connection release function 140 which processes the connection release message(s) 122 received from control node 26₂. The connection release function 140 preferably includes a release/termination authenticator 142.

The example radio network controller 26 and base station 28 as shown in FIG. 3 are radio network nodes that each include a corresponding data processing and control unit 36 and 37, respectively, for performing numerous radio and data processing operations required to conduct communications between the RNC 26 and the user equipment units (UEs) 30. Part of the equipment controlled by the base station data processing and control unit 37 includes plural radio transceivers 38 connected to one or more antennas 39.

In the example mode presently under discussion, the node which prepares the reset message 102 is the control node which controls the connections. In an example implementation in which the UTRAN 24 of FIG. 2 is the radio access network, the control node is the control node 26₁, which functions as a serving RNC (SRNC) node for the connections which it controls. In this example implementation, the reset message 102 is more formally termed a RNSAP RESET REQUEST message. The control node 26₂ which receives the reset message 102 (RNSAP RESET REQUEST message) is a drift RNC (DRNC) node. In this example implementation, the control node 26₂ prepares two types of connection release messages 122 for transmission to the base stations 28 having radio resources controlled by control node 26₂, i.e., a RRC CONNECTION RELEASE message and a PAGING TYPE 1 message. Hereinafter, such a connection release message (e.g., RRC CONNECTION RELEASE message or PAGING TYPE 1 message) sent by the control node 26₂ is also known as the "further message" and, as explained hereinafter, also carries the subset reset element.

Figure 4A:
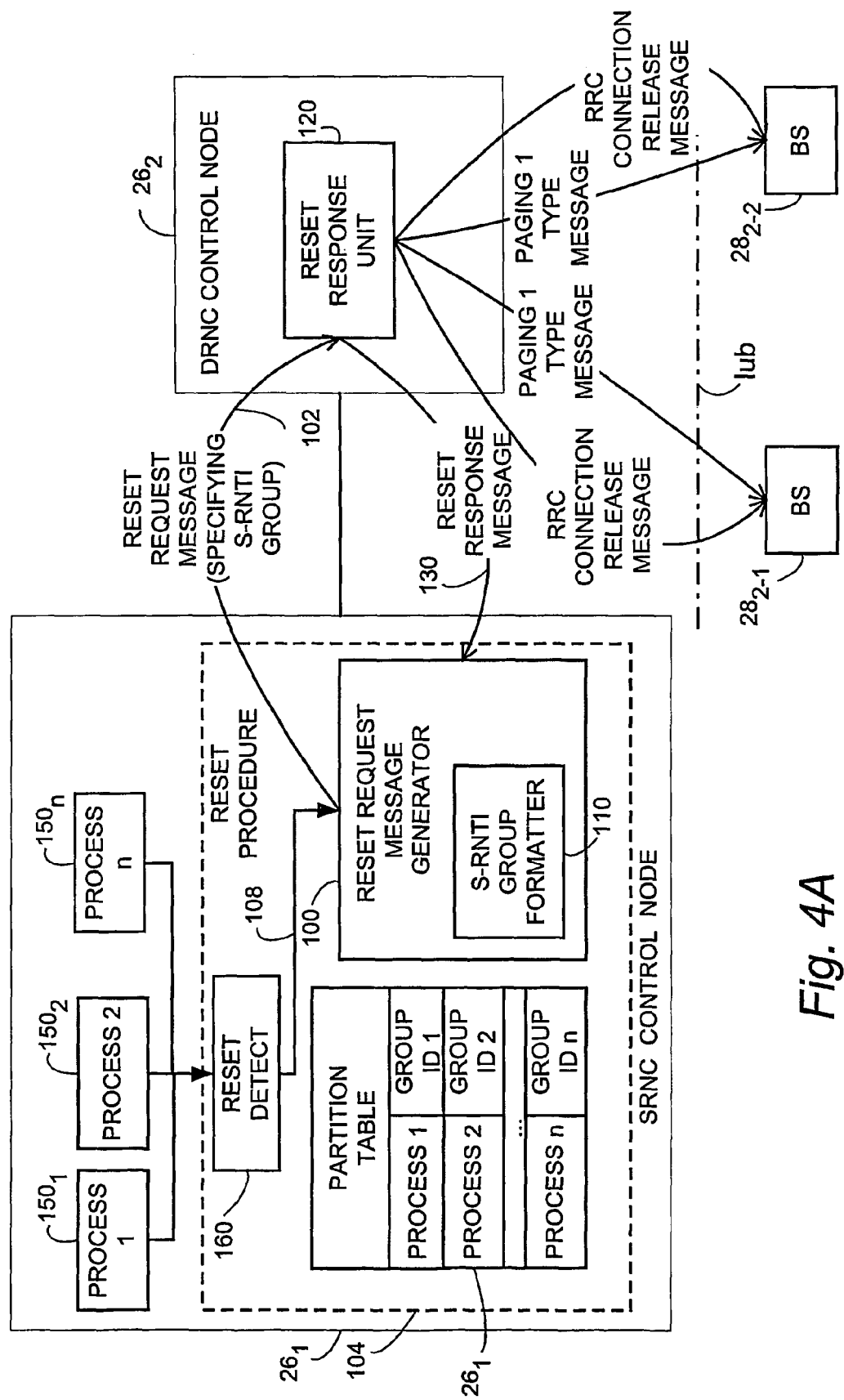
FIG. 4A is a schematic view of portions of a radio access network showing two control nodes in like manner as FIG. 1, with one of the control node performing plural processes, with each of the plural processes handling a respective one of plural subsets of connections.

Inclusion of the subset reset element in the reset message 102 is particularly advantageous in a situation in which a control node such as control node 26₁ performs plural processes, with each of the plural processes handling a respective one of plural subsets of connections. For example, the particular control node 26₁ of FIG. 4A is illustrated as performing processes 150₁, 150₂, through 150ₙ. As used herein, each process 150 may be considered to be either a functional process performed by one or more constituent units or elements of the control node, or specific hardware of the control node. For example, each process 150 may itself be a processor which is partially or wholly dedicated to performing a certain function or process on behalf of a subset of connections which it serves.

Figure 4B:
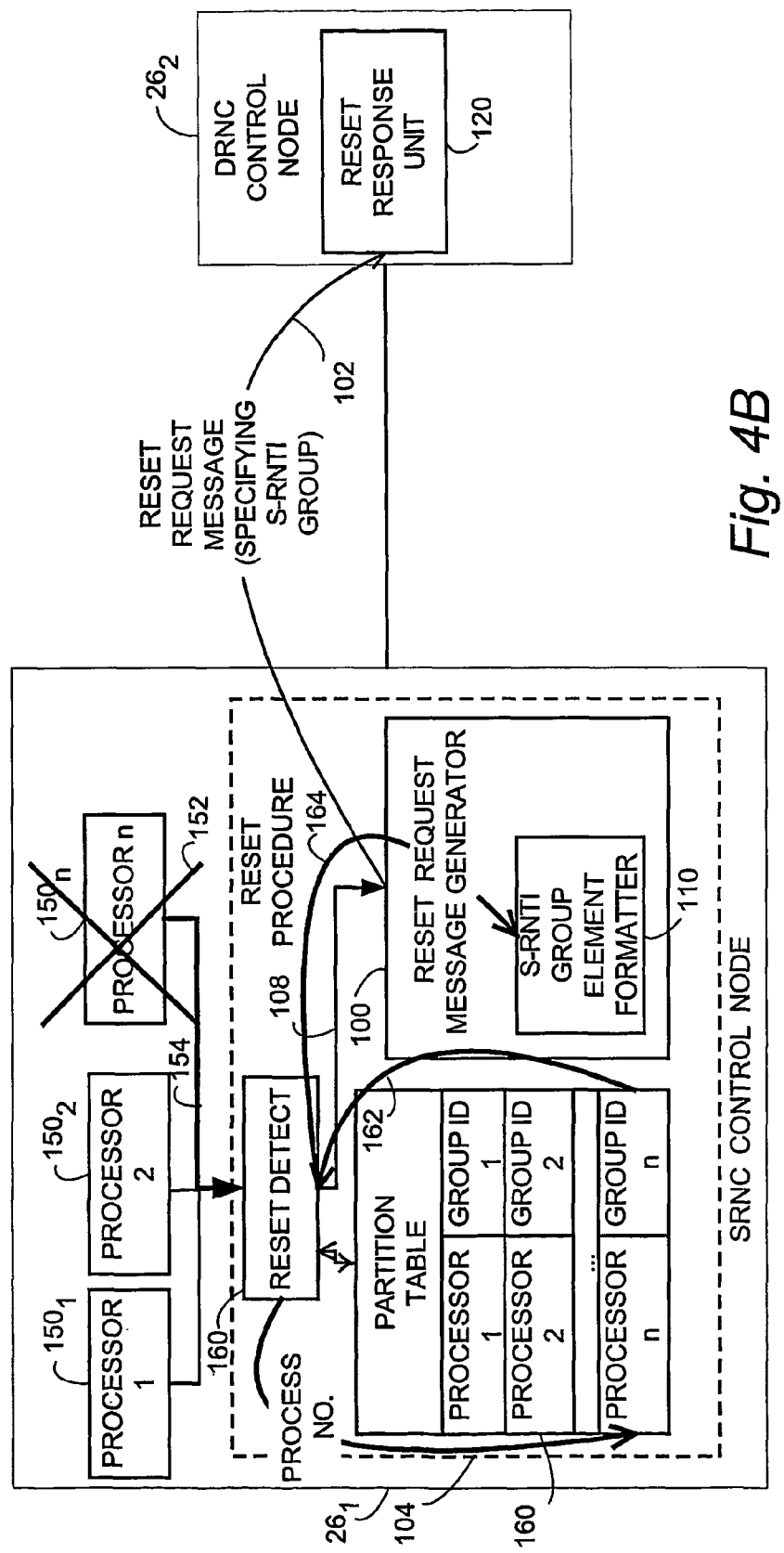
FIG. 4B is a schematic view of portions of a radio access network in like manner as FIG. 4A and showing basic actions performed by a reset procedure upon reset of one of plural processes.

In a multi-process partitioned situation such as illustrated in FIG. 4A, when the reset procedure 104 affects a specific one of the processes 150, a subset reset element corresponding to the respective one of the plural subsets of connections handled by the specific affected process is included in the message 102. Such is illustrated in FIG. 4B, in which an X denoted by reference numeral 152 depicts a reset for processor 150ₙ. Note that in the FIG. 4B scenario actual restart of a processor is involved, and that partitioning of group IDs is based on processor to which the connection is assigned. In the scenario of FIG. 4B, as an example processor 150ₙ has been required to reboot, e.g., reset. An indication of the reset for processor 150ₙ is applied as indicated by arrow 154 to reset detector 106. The reset detector 106 can itself be a processor (i.e., an independent processor not affected by the reset process) which is connected by a bus or the like to obtain an electric signal indicative of reset of processor 150ₙ.

Noting the processor number (n) involved in the reset (i.e., processor 150ₙ), reset detector 106 consults a partition table 160 which comprises reset procedure 104. The partition table 160 includes a list of the processors 150 (shown in the first column of partition table 160), and an associated group identifier (group ID) for each processor (shown in the second column of partition table 160). As shown by arrow 162, the reset detector 106 obtains from partition table 160 the associated group identifier (group ID) for the processor affected by the reset. In the example scenario of FIG. 4B, reset detector 106 obtains from partition table 160 the group ID for processor 150ₙ, as depicted by arrow 164 in FIG. 4B.

At this point it is beneficial to note that in control node 26₁ a deliberate partitioning has occurred with respect to processes/processors 150 and assignment of connection identifiers. In the example scenario, the group ID is a S-RNTI-formatted identifier. It will be recalled that an S-RNTI identifies the RRC connection within the particular SRNC. So, for the specific example of FIG. 4B, the connections handled by process 150₁ are assigned S-RNTI values that have a same first value (indicative of process 150₁) in predetermined bit positions of their S-RNTI. For example, the connections handled by processor 150₁ are assigned S-RNTI values that have a same first value indicative of processor 150₁, i.e., "00", in the two most significant bit positions of their S-RNTI. Similarly, the connections handled by processor 150₂ are assigned S-RNTI values that have a same second value (indicative of processor 150₂) in the predetermined bit positions of their S-RNTI (e.g., "01" in the two most significant bit positions of their S-RNTI), and so on. In other words, assuming that the total number of processes n=3 in the FIG. 4B scenario, S-RNTI values are assigned to connections as set forth in Table 1 in accordance with which of the processors handles the connection. In Table 1, the "X" values in the S-RNTI value can be any value. What is important is that the predetermined bit positions indicative of the processor (e.g., the two most significant bit positions as shown in boldface in Table 1 for the FIG. 4B scenario) be common for all connections of a same partition or sub-partition handled by the same processor. The pattern of "X" values in the S-RNTI is a group bit mask, and the number of "X" values in the S-RNTI is related to a group bit mask index subsequently described.

TABLE 1

| Process(or) Number | S-RNTI values assignable to connection handled by process(or) (S-RNTI group ID) |
| --- | --- |
| Process(or) 1 | XXXXXXXXXXXXXXXXXX00 |
| Process(or) 2 | XXXXXXXXXXXXXXXXXX01 |
| Process(or) 3 | XXXXXXXXXXXXXXXXXX10 |

It should be understood that the above-described specific technique of partitioning is just one example, and that other techniques and variations of the above-described technique are possible. For example, a particular processor may have more than one group ID associated therewith. Considering the FIG. 4B scenario and Table 1, for example, processor n (n=3) could be further partitioned into two sub-partitions. For example, connections in a first sub-partition handled by processor $150_n$ can have the an S-RNTI of the form XXXXXXXXXXXXXXXXXX10 as depicted in Table 1, while connections in a second sub-partition handled by processor $150_n$ can have the an S-RNTI of the form XXXXXXXXXXXXXXXXXX11.

Having obtained the group ID for processor $150_n$, as depicted by arrow 164 in FIG. 4B, the reset detector 106 sends the group ID to reset message generator 100. In conjunction with generating the reset message generator 100, the reset detector 106 invokes its subset reset element formatter 110, also known as the S-RNTI group element formatter.

Figure 6:
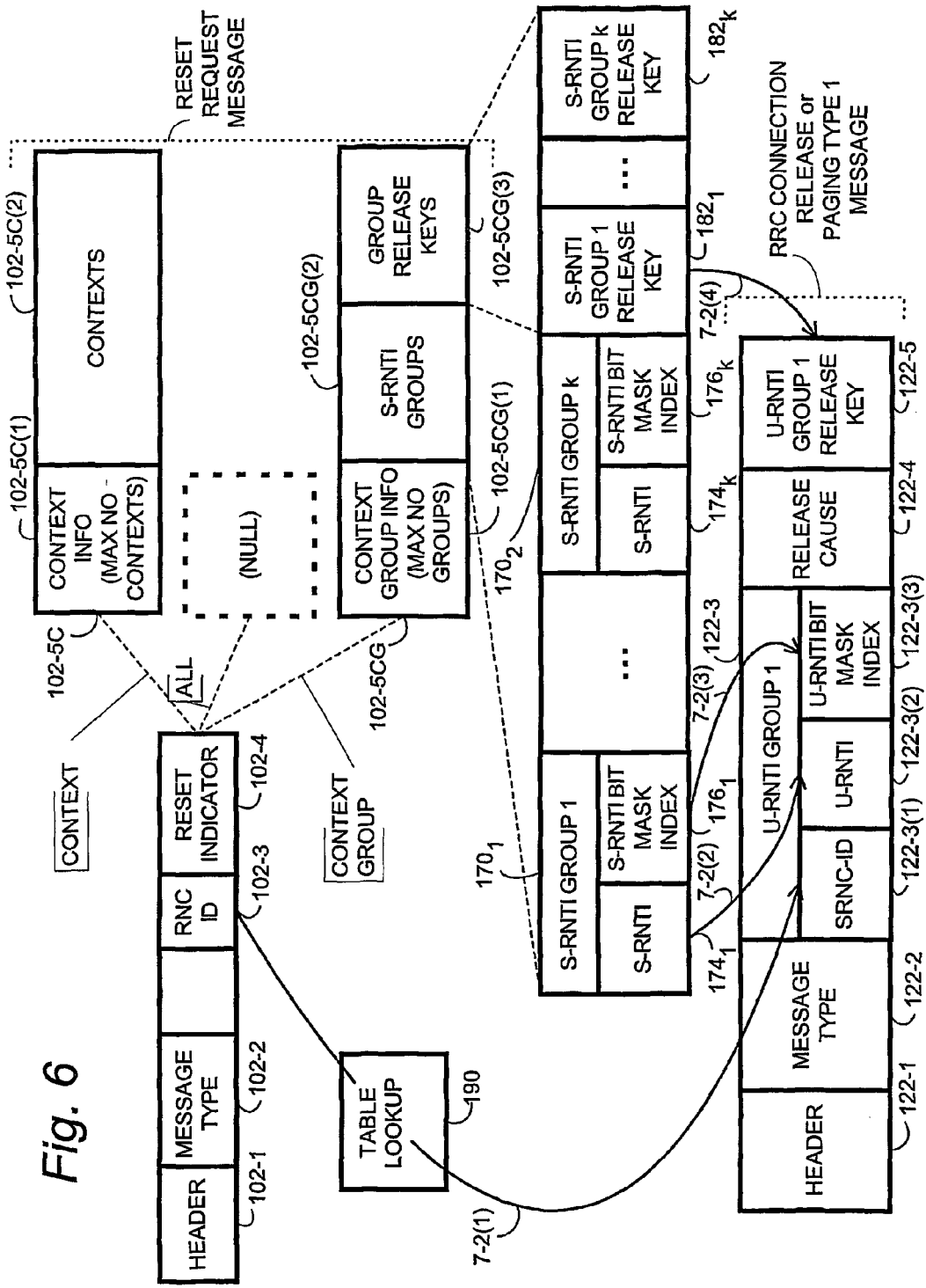
FIG. 6 is a diagrammatic view showing an example illustrative format of a reset request message and an example illustrative format of one of a RRC CONNECTION RELEASE and PAGING TYPE 1 message.

FIG. 6 illustrates an example, non-limiting format of reset message 102, specifically when the reset message 102 takes the form a RESET REQUEST message. As shown in FIG. 6, the reset message 102 includes the following information elements or parts: header 102-1, message type identifier 102-2, RNC identifier (RNC ID) 102-3, and reset indicator 102-4. The message type identifier 102-2 identifies the message 102 as being, e.g., a RESET REQUEST message. The RNC identifier (RNC ID) 102-3 specifies the particular control node, e.g., control node $26_1$, which originated the reset message 102.

In accordance with an example implementation under discussion, the reset indicator 102-4 of reset message 102 can have one of three possible values. The value in reset indicator 102-4 determines the format of the remainder of reset message 102. For example, the reset indicator 102-4 can have a first value of CONTEXT, in which case the remainder of the reset message 102 takes the form of a context payload depicted by 102-5C of FIG. 6. Alternatively, the reset indicator 102-4 can have a first value of ALL, in which case the reset indicator 102-4 effectively terminates the reset message 102. As another alternative particularly pertinent to features described herein, the reset indicator 102-4 can have a first value of CONTEXT GROUP, in which case the remainder of the reset message 102 takes the form of a context group payload depicted by 1025-CG of FIG. 6.

The context payload 102-5C included in the reset message 102 when the reset indicator 102-4 has the value CONTEXT includes context information element 102-5C(1) and a series 102-5C(2) of context information elements. The context information element 102-5C(1) advises of the number of context information elements included in the series of 102-5C(2). The context payload 102-5C is of the type traditionally used when there no mapping or partitioning scheme between processes and connection identifiers. In other words, the context payload 102-5C can be used if there is a restart of one of the processes or processors, but the particular connection addressing scheme was not structured or usable for association with group IDs such as S-RNTIs. The context payload 102-5C thus laboriously includes a separate identification of each individual connection controlled by control node $26_1$ that was affected by a reset.

The context group payload 102-5CG included in the reset message 102 when the reset indicator 102-4 has the value CONTEXT GROUP includes context group information element 102-5CG(1); a series 102-5CG(2) of S-RNTI groups; and a corresponding series 102-5CG(3) of group release keys. The context group information element 102-5CG(1) advises of the number of S-RNTI group information elements included in the series 102-5CG(2), which is the same as the number of group release keys included in series 102-5CG(3). For the particular example context group payload 102-5CG shown by exploded format in FIG. 6, the value of context group information element 102-5CG(1) is k, meaning that k number of subsets of connections were affected by reset of a corresponding k number of processes. It should be understood that, with reference to the example scenario of FIG. 4A, k can be any number between 1 and (n−1), where n is the total number of processes performed by control node $26_1$.

Each S-RNTI group included in the series 102-5CG(2) is an example of a subset reset element, previously described, since the S-RNTI group comprises a group identity for the subset of connections affected by the reset. FIG. 6 shows specifically S-RNTI group $170_1$ through S-RNTI group $170_k$ as being included in context group payload 102-5CG.

Each group identity (i.e., S-RNTI group) 170 in turn comprises a group value 174 and a group bit mask index 176. It is the group ID number obtained by reset detector 106 from partition table 160 and applied to reset message generator 100 (as indicated by arrow 164 in FIG. 4B) that reset message generator 100 uses in the group value information element 174. The group bit mask index 176 indicates bits of the group value which are common for all connections of the subset of connections. That is, the group bit mask index indicates the bits of the group S-RNTI which are common for all connections of the subset of connections. For the example scenario of Table 1, the group bit mask index has a value pointing to bit 19, which means that bits of the S-RNTI that are less significant than bit 19 are to be ignored in determining which bits are the common bits for the connections of the subset or group. In other words, the bits less significant than bit 19 define the group bit mask. Therefore, it can be ascertained from the group bit mask index that the first two most significant bits (bit 20 and bit 19 according to 3GPP convention) of the S-RNTI value in information element 174 refer to the affected process and are to be used in recognizing connections in the subset (since those connections have the common value in the first two most significant bits of the S-RNTI field).

As indicated above, the reset message 102 can include plural subset reset elements, as reflected by inclusion of S-RNTI group $170_1$ and S-RNTI group $170_k$ in FIG. 6. Inclusion of two S-RNTI groups 170 in reset message 102 can occur, for example, in the example scenario discussed above in which two group IDs are associated with a single process, e.g., when a process is sub-partitioned to have two group IDs. In this regard, recall that it was previously mentioned that the process n (n—3) could be partitioned into two sub-partitions, such as a first sub-partition handled by process 150$_n$ which has an S-RNTI of the form XXXXXXXXXXXXXXXXXX10 and a second sub-partition handled by process 150$_n$ which has an S-RNTI of the form XXXXXXXXXXXXXXXXXX11. In such example, the S-RNTI group 170$_1$ may have the S-RNTI of XXXXXXXXXXXXXXXXXX10, while the S-RNTI group 170$_k$ may have the S-RNTI of XXXXXXXXXXXXXXXXXX11.

Thus, as facilitated by the subset reset element(s) included in context group payload 102-5CG, the connections affected by the reset are collectively referenced in the message. The subset reset element identifies the subset of affected connections.

Figure 5:
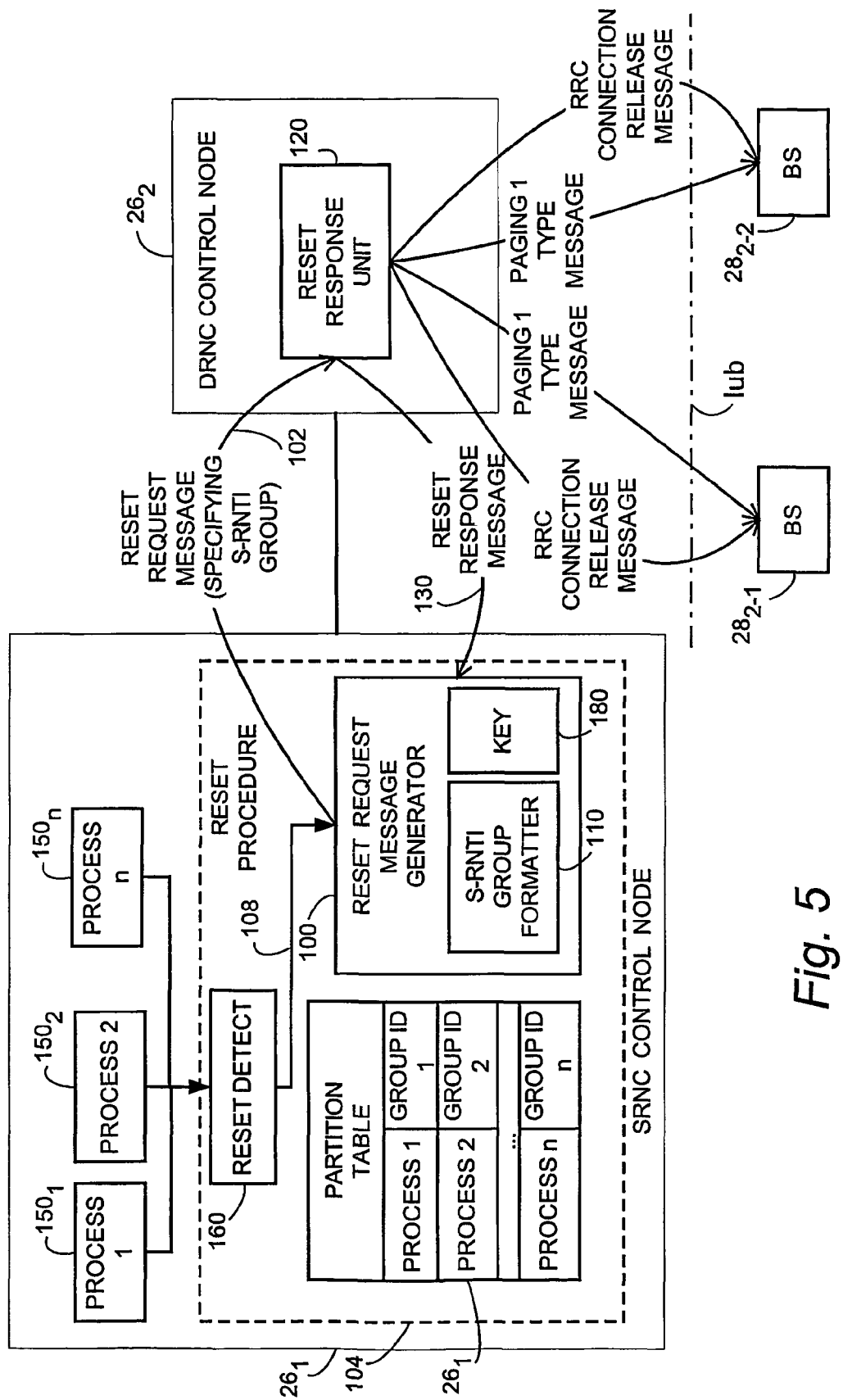
FIG. 5 is a schematic view similar to FIG. 4A, but further showing that a reset message generator of the control node may optionally include authentication indicia (e.g., group release key) formatter.

As an optional but preferred feature, the message can also include an authorization or authentication mechanism, also known as a group release key. The group release key can be a bit string of predetermined size, e.g., 128 bits. The authentication mechanism renders a communications network impervious to unauthorized requests for termination or cessation of interaction with a mobile node. To this end, FIG. 5 shows reset message generator 100 as including, in addition to subset reset element formatter 110, an authentication indicia or group release key generator 180. The reset message generator 100 includes, in the group release key series 102-5CG(3) of the context group payload 102-5CG, a group release key for each S-RNTI group, shown as release keys 182 in FIG. 6. For the example scenario in which the context group payload 102-5CG includes the S-RNTI groups 170$_1$ through 170$_k$, group release keys 182$_1$ through 182$_k$ are shown as included.

Generation of the group release keys, also known as the authentication indicia, is described in more detail in U.S. patent Ser. No. 10/113,944, filed Apr. 2, 2002, entitled "AUTHENTICATION OF TERMINATION MESSAGES IN TELECOMMUNICATIONS SYSTEM", already incorporated by reference.

Upon receipt of the reset message 102, the DRNC (e.g., control node 26$_2$) for all indicated UE Context Groups identified by the S-RNTI Group IE (e.g., series 102-5CG(2), removes all the indicated UE Contexts and all the radio resources allocated for these UE Contexts, using the appropriate group release key information element. The DRNC also initiates release of the dedicated or common user plane resources that were involved in these UE Contexts.

Figure 7:
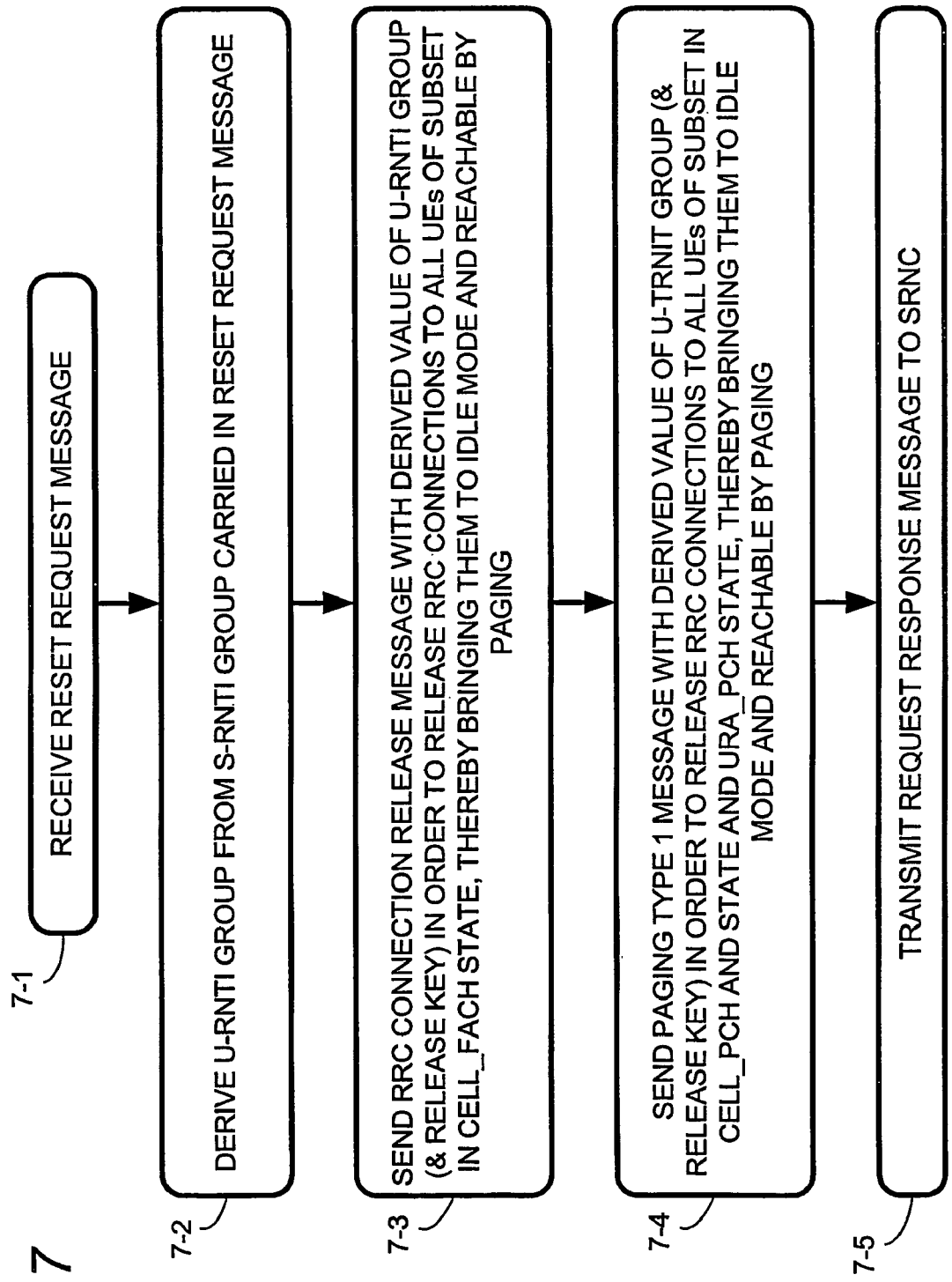
FIG. 7 is a flow chart showing basic steps performed by a reset response unit of a responding control node in accordance with an example implementation.
Figure 8:
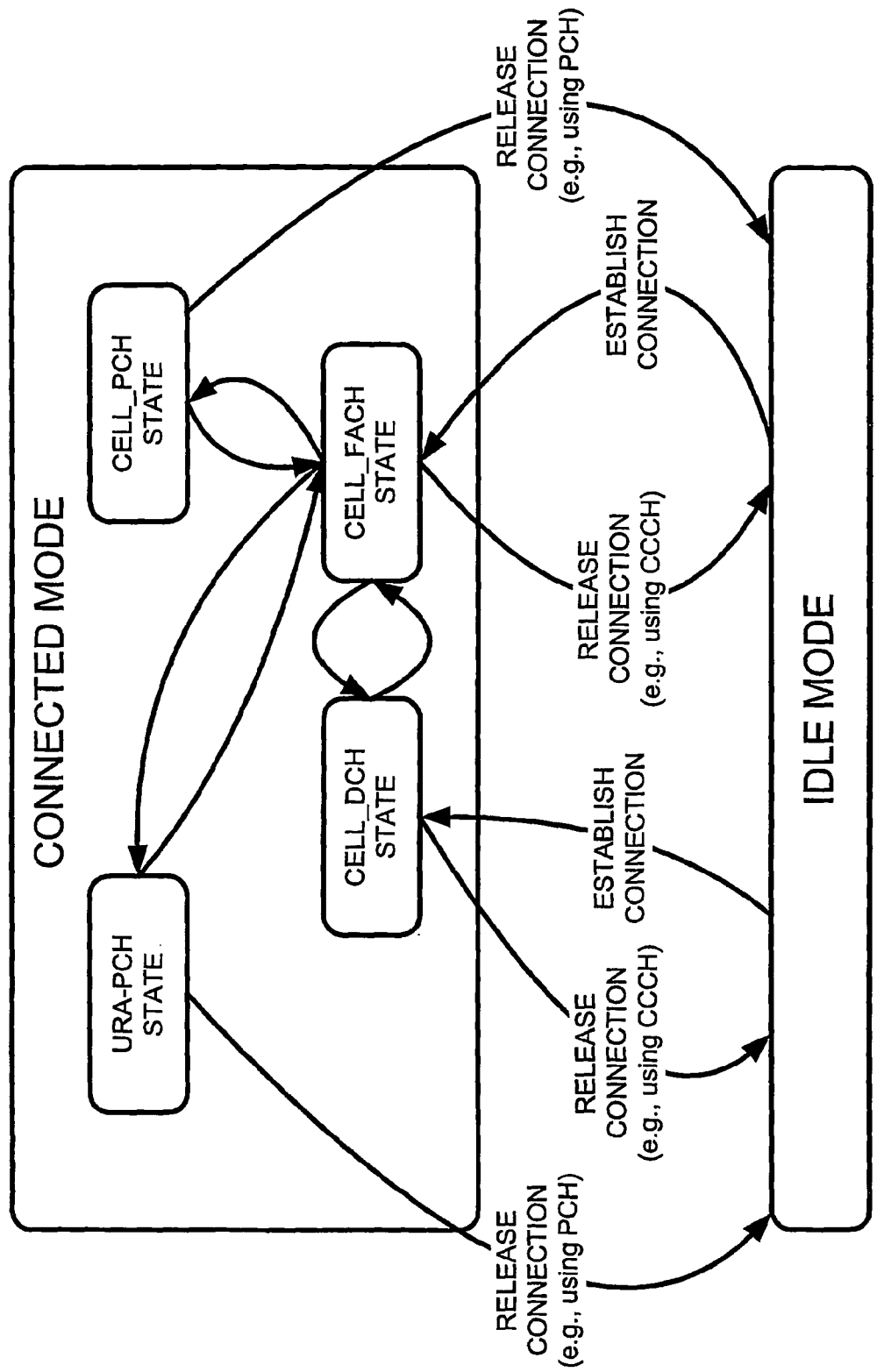
FIG. 8 is a diagrammatic view showing modes and states of a user equipment unit (UE).

FIG. 7 shows certain selected basic steps performed by a reset response unit 120 of a responding control node (e.g., control node 26$_2$) in accordance with an example implementation. Step 7-1 depicts the reset response unit 120 receiving the reset message 102 (e.g., the RESET REQUEST message) from control node 26$_1$ over the Iur interface. As explained with reference to FIG. 7, the reset response unit 120 uses the information included in the reset message 102 to prepare the connection release messages. As previously indicated, the UTRAN the connection release message include the RRC CONNECTION RELEASE message(s) and the PAGING TYPE 1 message(s).

In addition to showing an example format of the reset message 102, FIG. 6 also shows an example format of a connection release message. The example format of the connection release message 122 illustrated in FIG. 6 is equally applicable to both the RRC CONNECTION RELEASE message and the PAGING TYPE 1 message, for which reason both are collectively referred to as the connection release message. The connection release message 122 begins with a header 122-1 and also includes a message type information element 122-2. Both the RRC CONNECTION RELEASE message(s) and the PAGING TYPE 1 messages include an information element known as the U-RNTI group, represented by information element 122-3 in FIG. 6. Further, the connection release message includes a release cause information element 122-4, and a U-RNTI group release key information element 122-5.

Therefore, after reception of the reset message 102, as step 7-2 the reset response unit 120 derives the contents needed for the U-RNTI group 122-3, so that the U-RNTI group 122-3 can be included in the connection release message. FIG. 6 particularly shows a scenario in which a U-RNTI group information element 122-3 is being obtained for the S-RNTI group 170$_1$. For sake of simplification and ease of illustration, the connection release message of FIG. 6 is shown to include only one U-RNTI group 122-3, although it can be understood from analogy to explanation discussion of the reset message 102 that plural U-RNTI group information elements 122-3 can be included in the connection release message.

The U-RNTI group information element 122-3 comprises three constituent information elements, particularly the SRNC-ID information element 122-3(1); the U-RNTI information element 122-3(2); and the U-RNTI bit mask index 122-3(3). The U-RNTI group information element 122-3 with its constituent information elements is derived in the following manner.

As step 7-2(1) (see FIG. 6), the SRNC-ID information element 122-3(1) in the U-RNTI 122-3 is set to the identity of the RNC that sent the RESET REQUEST message (e.g., reset message 102). The SRNC-ID information element 122-3(1) can be determined in various ways. For example, as illustrated in FIG. 6, the reset response unit 120 knows from information element 6-3 of the reset message 102 the RNC ID of the RNC which originated the reset message 102 (e.g., control node 26$_1$). For example, the RNC ID included in the reset message 102 may be the source address in a SS#7 received message or an IP header of the received message. Using a lookup table 190 or the like, the reset response unit 120 can use the RNC ID contained in the reset message 102 as an index to obtain the SRNC-ID which is to be utilized for information element 122-3(1).

As step 7-2(2) (see FIG. 6), the reset response unit 120 sets the U-RNTI information element 122-3(2) to the value of the S-RNTI information element 174$_1$ of the corresponding S-RNTI group 170$_1$. As step 7-2(3) (see FIG. 6), the reset response unit 120 sets the U-RNTI bit mask index 122-3(3) equal to the corresponding S-RNTI bit mask index 176$_1$. As step 7-2(4) (see FIG. 6), the reset response unit 120 sets the U-RNTI group release key 122-5 equal to the S-RNTI group release key 182$_1$.

Having prepared at step 7-2 the constituent information elements for the connection release messages, at step 7-3 the reset response unit 120 sends the RRC CONNECTION RELEASE message with the derived values to the base stations under the control of control node 26$_2$ which have connections controlled by control node 26$_1$. Transmission of the RRC CONNECTION RELEASE message results in a connected mode user equipment unit 30 which belongs to the subset and which is in the CELL_FACH state receiving a message which causes their connection release functions 140 (see FIG. 3) to release its RRC connection. Release of the RRC connection returns the affected user equipment unit to idle mode, thereby rendering the user equipment unit reachable by paging.

In similar manner, as step 7-4 the reset response unit 120 sends the PAGING TYPE 1 message with the derived values to the base stations under the control of control node 26₂ which have connections controlled by control node 26₁. Transmission of the PAGING TYPE 1 message results in a connected mode user equipment unit 30 which belongs to the subset and which is in either the CELL_PCH state or the CELL_URA state receiving a message which causes their connection release functions 140 (see FIG. 3) to release its RRC connection. Release of the RRC connection returns the affected user equipment unit to idle mode, thereby similarly rendering the user equipment unit reachable by paging.

As step 7-5, the reset response unit 120 transmits the REQUEST RESPONSE message 130 back to the SRNC (e.g., to control node 26₁).

Thus, the drift radio network control (DRNC) node 26₂ prepares a message of a type such as one of a RRC CONNECTION RELEASE message and a PAGING TYPE 1 message which is sent to base stations in cells controlled by the DRNC node. Typically the drift radio network control (DRNC) node prepares and sends its message (e.g., RRC CONNECTION RELEASE message or PAGING TYPE 1 message), also known as the "further message", upon receipt from a serving RNC (SRNC) node of a prompting message (such as the RNSAP RESET REQUEST message) which also carries the subset reset element.

The connection release message prepared by the reset response unit 120, which is also herein known as the "further" message, includes a "further" subset reset element which is also a group identity. In the example of FIG. 6, the further subset reset element is the U-RNTI group 122-3. This further subset reset element (the U-RNTI group) comprises (1) a control node identifier indicative of the serving control node, (2) a group value, and (3) a group bit mask index. The group value, and the group bit mask index are derived from the subset reset element of the first message sent from the SRNC node (e.g., reset message 102).

Thus far discussed has been an example mode in which the node which prepares the reset message is a radio network control node (e.g., control node 26₁) which controls the connections which need to be released, albeit the connections are using radio resources controlled by another radio network control node (e.g., control node 26₂). But as understood with regard to the foregoing operation of the DRNC (e.g., control node 26₂), it is also understood that the "further" message such as the connection release message 122 sent by the DRNC can also qualify as the reset message or "message" as earlier characterized. When the message is considered to be the further message sent by the DRNC node, the subset reset element can again be conceptualized as comprising a group identity. For this further message sent by the DRNC, however, the group identity comprises a control node identifier 122-3 (1), a group value 122-3(2), and a group bit mask index 122-3(3). The group bit mask index 122-3(3) indicates bits of the group value which are common for all connections of the subset of connections. In an illustrated example involving the UTRAN, in the RRC CONNECTION RELEASE message or PAGING TYPE 1 message the group value is a group U-RNTI and the group bit mask index indicates the bits of the U-RNTI value which are common for all connections of the subset of connections.

The invention thus encompasses, not only specific nodes, but also a radio access network of a telecommunications system. The radio access network comprises a serving control node (which controls connections with user equipment units in a connected mode) and at least one drift control node (which provides radio resources in cells controlled by the at least one drift control node for some of the connections handled by the serving control node). In one mode, the serving control node (e.g., 26₁) sends the message with the subset reset element(s) to collectively indicate that a subset of the connections are to be released, thereby facilitating return to the idle mode of the user equipment units involved in the subset. In the example UTRAN implementation, the message is a RNSAP RESET REQUEST message. The at least one drift control node (e.g., 26₂) sends a further message (e.g., connection release message 122) to a base station controlled by the at least one drift control node, the further message including a further element, the further element being derived from the element included in the message.

The invention also thus encompasses methods of operating a radio access network of a telecommunications system, the radio access network including the serving control node and at least one drift control node. In accordance with the methods, a reset procedure is performed at the serving control node. The serving control node then sends to the at least one drift control (DRNC) node a message resulting from performance of the reset procedure, the message including the subset reset element(s). In the example UTRAN implementation, the message sent by the SRNC node is a RNSAP RESET REQUEST message. The DRNC node uses the message with the subset reset element so that the user equipment units involved in the subset of the connections can return to an idle mode. In particular, the DRNC node sends further messages to base stations in cells controlled by the DRNC node. In the example UTRAN implementation, such message can be one or more of a RRC CONNECTION RELEASE message and a PAGING TYPE 1 message. Reception of the further message by user equipment unit over an air interface causes the user equipment unit to release the RRC connection, and to return to idle mode (thereby leaving connected mode). Under these circumstances, the user equipment unit (now in idle mode) is in a better position than in the connected mode to receive paging.

The invention also encompasses the messages and message formats understood from the foregoing and the examples of FIG. 6, including a message which includes one or more elements (i.e., subset reset element(s)) which collectively indicate that a subset of the connections are to be released so that the user equipment units involved in the subset of the connections can return to an idle mode. Example formats of the reset message is also understood with reference to Table 2.

TABLE 2

Reset Request message format

| IE/Group Name | Presence | Range | IE Type and Reference | Semantic Description | Criticality | Assigned Criticality |
|---|---|---|---|---|---|---|
| Message Type | M | | 9.2.1.40 | | YES | reject |
| Transaction ID | M | | 9.2.1.59 | | — | |
| RNC-ID | M | | 9.2.1.50 | Identity of the sending RNC | YES | reject |

TABLE 2-continued

Reset Request message format

| | | | | | |
|---|---|---|---|---|---|
| CHOICE Reset Indicator | M | | | YES | reject |
| >Context | | | | — | |
| >>Context Information | | 1 ... <maxResetContext> | | EACH | reject |
| >>>CHOICE Context Type | M | | | — | |
| >>>>SRNTI | | | | — | |
| >>>>>S-RNTI | M | | 9.2.1.53 | — | |
| >>>>DRNTI | | | | — | |
| >>>>>D-RNTI | M | | 9.2.1.24 | — | |
| >Context group | | | | YES | reject |
| >>Context group information | | 1 ... <maxResetContextGroups> | | — | |
| >>>S-RNTI group | M | | 9.2.1.53a | — | |
| >>>Group Release Key | M | | 9.2.1.30La | — | |
| >All Contexts | | | NULL | — | |

| Range bound | Explanation |
|---|---|
| MaxResetContext | Maximum number of contexts that can be reset by one RESET message. |
| MaxResetContextGroups | Maximum number of context groups that can be reset by one RESET message. |

As explained above, the S-RNTI group (see information element 170 in FIG. 6) identifies a group of UEs in the SRNC. The S-RNTI group is also explained with reference to Table 3.

TABLE 3

S-RNTI Group

| IE/Group Name | Presence | Range | IE Type and Reference | Semantics Description |
|---|---|---|---|---|
| S-RNTI | M | | 9.2.1.53 | |
| S-RNTI bit mask index | M | | Enumerated( b1, b2, ... b19) | |

In Table 3, the S-RNTI group is identified by all S-RNTI values whose bits starting from the most significant bit down to, and including, the bit indicated by S-RNTI bit mask index, are equal to the corresponding bits of the S-RNTI in this information element. The bits of the S-RNTI in this IE that are less significant than the bit position indicated by the S-RNTI bit mask index are ignored.

By virtue of the concept of UE group addressing included in the RRC CONNECTION RELEASE, many CELL_FACH state UEs can be released at once using a single message. In corresponding fashion, the concept of UE group addressing includes in the PAGING TYPE 1 message permits many user equipment units in the CELL_PCH state and the URA_PCH state UEs to be released with just one message. Yet without the inclusion of the subset reset element in the reset message 102 as herein described, the DRNC is unable to use the concept of group addressing to release a subset of connections upon reset of a process of the RNC. Rather, without the subset reset element, the DRNC has to release the RRC connections one by one (from the S-RNTI list in the message or all S-RNTIs), which will take considerable time and pages will be missed to those UEs.

The group release mechanism as reflected by the subset reset element also works for UEs that camps in cells controlled by another RNC than the RNC that restarted. This means that the UEs will be reachable for paging much quicker, even in case the UEs camped in a cell controlled by a different RNC (the DRNC) than they had as their SRNC.

While the invention has been described in connection with what is presently considered to be the most practical and preferred embodiment, it is to be understood that the invention is not to be limited to the disclosed embodiment, but on the contrary, is intended to cover various modifications and equivalent arrangements.

What is claimed is:

1. A node of a radio access network of a telecommunications system which prepares a message for transmission to at least one other node of the radio access network, the message being an intra-radio access network message by being sent from the node to the at least one another node, the message resulting from occurrence of a reset procedure affecting a control node which controls connections with user equipment units in a connected mode, the message including an element which collectively indicates that a subset of the connections are to be released so that the user equipment units involved in the subset of the connections can return to an idle mode, the element being included in the message in lieu of an individual listing of the connections affected by the reset, the element being recognizable when included in a further message received over an air interface by a user equipment unit having a connection in the subset whereby the user equipment unit can determine if it is to return to the idle mode.

2. The node of claim 1, wherein the node which prepares the message is a radio network control node which controls the connections.

3. The node of claim 1, wherein the node performs plural processes with each of the plural processes handling a respective one of plural subsets of connections with user equipment units in the connected mode, and wherein when the reset procedure affects a specific one of the plural processes, an element corresponding to the respective one of the plural subsets of connections handled by the specific one of the plural processes is included in the message.

4. The node of claim 1, wherein the element comprises a group identity for the subset of connections; wherein the group identity comprises a group value and a group bit mask index, wherein the group bit mask index indicates bits of the group value which are common for all connections of the subset of connections; and wherein the group value is a group S-RNTI and the group bit mask index indicates the bits of the group S-RNTI which are common for all connections of the subset of connections.

5. The node of claim 1, wherein the further message is prepared by a drift radio network control node which provides radio resources for the connections handled by a serving radio network control node.

6. The node of claim 5, wherein the element comprises a group identity for the subset of connections; wherein the group identity comprises a group value, and a group bit mask index, wherein the group bit mask index indicates bits of the group value which are common for all connections of the subset of connections; and wherein the group value is a group U-RNTI and the group bit mask index indicates the bits of the U-RNTI value which are common for all connections of the subset of connections.

7. The node of claim 1, wherein the reset procedure occurs as a result of a failure of the node or of a core network node.

8. A radio access network of a telecommunications system comprising:
a serving control node of the radio access network which controls connections with user equipment units in a connected mode;
at least one drift control node of the radio access network which provides radio resources in cells controlled by the at least one drift control node for some of the connections handled by the serving control node;
wherein the serving control node sends a message for transmission to the at least one drift control node of the radio access network, the message being an intra-radio access network message by being sent from the node to the at least one another node, the message resulting from occurrence of a reset procedure affecting the serving control node, the message including an element which collectively indicates that a subset of the connections are to be released so that the user equipment units involved in the subset of the connections can return to an idle mode, the element being included in the message in lieu of an individual listing of the connections affected by the reset, the element being recognizable when included in a further message received over an air interface by a user equipment unit having a connection in the subset whereby the user equipment unit can determine if it is to return to the idle mode.

9. The network of claim 8, wherein the at least one drift control node is arranged, upon receipt of the message, to send a response message to the serving control node.

10. The network of claim 8, wherein the at least one drift control node sends the further message via a base station controlled by the at least one drift control node, the further message including a further element, the further element being derived from the element included in the message.

11. The network of claim 10, wherein the further element comprises a group identity for the subset of connections; wherein the group identity comprises a control node identifier indicative of the serving control node, a group value, a group bit mask index, and wherein the group bit mask index indicates bits of the group value which are common for all connections of the subset of connections; and wherein the group value is a group U-RNTI and the group bit mask index indicates the bits of the U-RNTI value which are common for all connections of the subset of connections.

12. The radio access network of claim 8, wherein the reset procedure occurs as a result of a failure of the serving control node or of a core network node.

13. A method of operating a node of a radio access network of a telecommunications system which prepares a message for transmission to at least one other node of the radio access network, the message being an intra-radio access network message by being sent from the node to the at least one another node, the message resulting from occurrence of a reset procedure affecting a control node which controls connections with user equipment units in a connected mode, the method comprising including in the message an element which collectively indicates that a subset of the connections are to be released so that the user equipment units involved in the subset of the connections can return to an idle mode, element being included in the message in lieu of an individual listing of the connections affected by the reset, the element being recognizable when included in a further message received over an air interface by a user equipment unit having a connection in the subset whereby the user equipment unit can determine if it is to return to the idle mode.

14. The method of claim 13, further comprising using a radio network control method which controls the connections to prepare the message.

15. The method of claim 13, further comprising:
performing at the node plural processes with each of the plural processes handling a respective one of plural subsets of connections with user equipment units in the connected mode;
when the reset procedure affects a specific one of the plural processes, including in the message an element corresponding to the respective one of the plural subsets of connections handled by the specific one of the plural processes.

16. The method of claim 13, further comprising using a drift radio network control node which provides radio resources for the connections handled by a serving radio network control node to prepare the further message.

17. The method of claim 13, wherein the reset procedure occurs as a result of a failure of the node or of a core network node.

18. A method of operating a radio access network of a telecommunications system which includes a serving control node and at least one drift control node, the serving control node handling connections with user equipment units in a connected mode, the at least one drift control node providing radio resources in cells controlled by the at least one drift control node for some of the connections handled by the serving control node, the method comprising:
performing a reset procedure at the serving control node;
sending from the serving control node to the at least one drift control node a message resulting from performance of the reset procedure, the message being an intra-radio access network message by being sent from the node to the at least one another node, the message including an element which collectively indicates that a subset of the connections are to be released, element being included in the message in lieu of an individual listing of the connections affected by the reset, the element being recognizable when included in a further message received over an air interface by a user equipment unit having a connection in the subset whereby the user equipment unit can determine if it is to return to the idle mode; and
using the further message so that the user equipment units involved in the subset of the connections can return to an idle mode.

19. The method of claim 18, further comprising:
performing at the serving control node plural processes with each of the plural processes handling a respective one of plural subsets of connections with user equipment units in the connected mode;
when the reset procedure affects a specific one of the plural processes, including in the message an element corresponding to the respective one of the plural subsets of connections handled by the specific one of the plural processes.

20. The method of claim 18, further comprising sending, from the at least one drift control node, a response message to the serving control node.

21. The method of claim 18, further comprising:
sending from the at least one drift control node the further message to the user equipment unit via a base station controlled by the at least one drift control node;
including in the further message a further element, the further element being derived from the element included in the message.

22. The node of claim 18, wherein the reset procedure occurs as a result of a failure of the node or of a core network node.

23. A message transmitted from a node of a radio access network of a telecommunications system to at least one other node of the radio access network, the message resulting from occurrence of a reset procedure affecting a control node which controls connections with user equipment units in a connected mode, the message being an intra-radio access network message by being sent from the node to the at least one another node, the message including an element which collectively indicates that a subset of the connections are to be released so that the user equipment units involved in the subset of the connections can return to an idle mode, element being included in the message in lieu of an individual listing of the connections affected by the reset, the element being recognizable when included in a further message received over an air interface by a user equipment unit having a connection in the subset whereby the user equipment unit can determine if it is to return to the idle mode.

* * * * *

UNITED STATES PATENT AND TRADEMARK OFFICE
CERTIFICATE OF CORRECTION

| | | |
|---|---|---|
| PATENT NO. | : 8,107,951 B2 | Page 1 of 1 |
| APPLICATION NO. | : 10/533643 | |
| DATED | : January 31, 2012 | |
| INVENTOR(S) | : Wallentin | |

It is certified that error appears in the above-identified patent and that said Letters Patent is hereby corrected as shown below:

In Fig. 2, Sheet 2 of 9, for Tag "12", in Line 1, delete "IDSN" and insert -- ISDN --, therefor.

In Column 1, Line 61, delete "Terrestial" and insert -- Terrestrial --, therefor.

In Column 10, Line 22, delete "GRPS" and insert -- GPRS --, therefor.

In Column 10, Line 25, delete "GRPS" and insert -- GPRS --, therefor.

In Column 10, Line 38, delete "GRPS" and insert -- GPRS --, therefor.

In Column 13, Line 33, delete "the an" and insert -- the --, therefor.

In Column 13, Line 36, delete "the an" and insert -- the --, therefor.

In Column 15, Line 6, delete "(n—3)" and insert -- (n=3) --, therefor.

Signed and Sealed this
Nineteenth Day of June, 2012

David J. Kappos
*Director of the United States Patent and Trademark Office*